United States Patent [19]

Kita et al.

[11] Patent Number: 4,739,618
[45] Date of Patent: Apr. 26, 1988

[54] HYDROSTATIC TRANSMISSION

[75] Inventors: Yasuo Kita, Kyoto; Tadashi Kanno, Otsu, both of Japan

[73] Assignee: Shimadzu Corporation, Kyoto, Japan

[21] Appl. No.: 921,095

[22] Filed: Oct. 21, 1986

[51] Int. Cl.⁴ .................. F16H 39/16; F16H 39/46
[52] U.S. Cl. ................................. 60/492; 91/497
[58] Field of Search .................. 60/491, 492; 91/497

[56] References Cited

U.S. PATENT DOCUMENTS

| | | | |
|---|---|---|---|
| 3,107,490 | 10/1963 | Cooper et al. | 60/492 X |
| 3,274,947 | 9/1966 | Jonkers et al. | 60/491 X |
| 3,643,433 | 2/1972 | Widmaier | 60/492 X |
| 3,765,183 | 10/1973 | Baurle | 60/491 |
| 4,137,826 | 2/1979 | Kita | 91/497 |
| 4,598,546 | 7/1986 | Van Kanegan | 60/491 |

*Primary Examiner*—Edward K. Look
*Attorney, Agent, or Firm*—Armstrong, Nikaido, Marmelstein & Kubovcik

[57] ABSTRACT

A hydraulic transmission has a pump and a hydraulic motor which are in communication with each other through a fluid passage and each of which has an eccentric or inclined movable member that is moved to vary the volume of liquid discharged by the pump or motor, the pump receiving an input rotation that is developed from the motor as an output rotation of a varied rotational frequency. The hydraulic transmission further includes a first element for urging the movable member of the pump in a first direction, a second element for urging the movable member of the motor in a second direction; and an actuating mechanism which moves the movable member of the pump a distance proportional to a control input, and which, when the displacement of the pump is varied, retains the movable member of the motor to keep the displacement of the motor constant, and which, when the movable member of the pump is retained at a certain position, moves the movable member of the motor a distance proportional to the control input.

8 Claims, 4 Drawing Sheets

HYDROSTATIC TRANSMISSION

FIELD OF THE INVENTION

The present invention relates to a transmission which can be used in various machines to transmit power from a rotary power source with a varied rotational speed.

BACKGROUND OF THE INVENTION

A hydrostatic transmission using two hydraulic engines one of which acts as a hydraulic pump when the other serves as a hydraulic motor finds wide application, because it can change speed continuously. Further, many transmissions of this kind have been studied and developed. A rotary fluid energy converter disclosed in Japanese Patent Laid-Open No. 77179/1983 is an example of such a hydraulic engine. Another conventional hydraulic transmission makes use of a combination of a piston pump and a motor of either the swash plate type or the bent axis type. In many conventional systems, only the pump has a variable displacement and the motor has a fixed displacement. Such an arrangement only allows a narrow range of speeds to be obtained. Further, even in systems where the pump and the motor have variable displacements, the two displacements are frequently varied independently of one another. This renders the control over the system complex.

SUMMARY OF THE INVENTION

It is an object of the instant invention to provide a hydraulic (or hydrostatic) transmission which makes use of hydraulic engines as mentioned above to yield an excellent efficiency, which is able to continuously and smoothly vary the ratio of the output rotational speed to the input rotational speed, and which is simple in structure.

The hydraulic (or hydrostatic) transmission according to the instant invention uses a plurality of hydraulic engines. The volume of liquid discharged by each of the hydraulic engines is varied by shifting its movable or eccentric member, like the aforementioned rotary fluid energy converter. One of the hydraulic engines is used as a pump, while the other is employed as a motor. Fluid passages communicating with these hydraulic engines are connected together. A control mechanism is provided to control the movement or displacement of the movable members. This control mechanism includes an urging means for urging the movable member of the pump in one direction, a second urging means for urging the movable member of the motor in one direction, and an actuating mechanism for actuating the movable members against the action of the urging means. The actuating mechanism is so located that its ends can directly bear against the movable members of the pump and motor or can be indirectly connected to the movable members. The actuating mechanism is so designed that the displacement of the pump is made variable only at a certain position where the displacement of the motor is a fixed displacement. The displacement of the motor is made variable only when the displacement of the pump is kept constant.

In another feature of the instant invention, when the movable member of the pump is shifted to increase or decrease the displacement of the pump, the movable member of the motor is shifted to respectively decrease or increase the displacement of the motor.

Other objects and features of the invention will appear in the course of description that follows.

BRIEF DESCRIPTION OF THE DRAWINGS

FIG. 5 is a side elevation in cross section of a modification of the hydraulic transmission shown in FIG. 1.

DETAILED DESCRIPTION OF THE INVENTION

Figure 1:
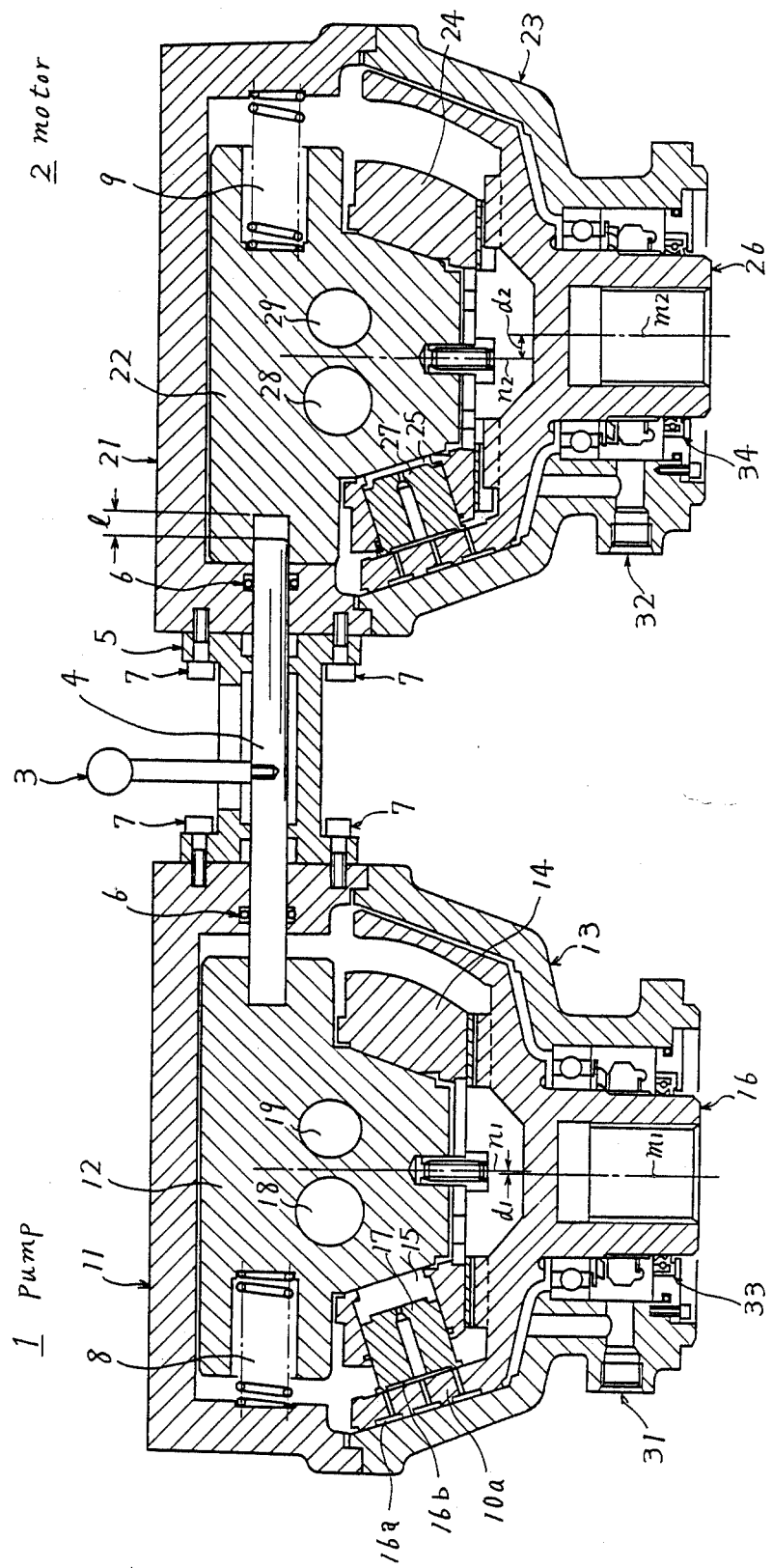
FIG. 1 is a side elevation in cross section of a first embodiment of a hydraulic transmission according to the instant invention.

Referring to FIG. 1, there is shown a hydraulic transmission according to the instant invention. This transmission has rotary fluid energy converters in the form of a pump 1 and in the form of a motor 2. Rotary force from a rotary power source (not shown) is applied to the rotating shaft 16 of the pump 1, so that it is converted into hydraulic energy which is then reconverted into mechanical energy by the motor 2. This mechanical energy is developed from the rotating shaft 26 of the motor 2 to actuate equipment (not shown) coupled to the shaft 26.

The pump 1 has housings 11 and 13. Similarly, the motor 2 has housings 21 and 23. The rotating shaft 16 is rotatably held within the housings 11 and 13. The rotating shaft 26 is rotatably held within the housings 21 and 23. Pintles 12 and 22 are held so as to be movable perpendicularly with respect to the shafts 16 and 26. Each one end portion of the pintles 12 and 22 has an inverted, truncated conic form. Cylinder blocks 14 and 24 are rotatably fitted over the cones of the pintles 12 and 22, respectively, and have holes 15 and 25, respectively. Pistons 17 and 27 are slidably mounted in the holes 15 and 25, respectively, in a substantially perpendicular relationship with regard to their corresponding cones.

A first static pressure bearing 16a is formed between the inner conic surface of the housing 13 and a portion of the outer conic surface of the rotating shaft 16. A second static pressure bearing 16b is formed by a combination of the end surface of each piston 17 and the inner, inclined surface of the shaft 16 that bears against the end surface of each piston 17. If torque is applied to the rotating shaft of the pump from driving equipment (not shown), a couple of forces corresponding to the input torque are produced by the first and second static pressure bearing. Mechanical energy is directly converted into fluid energy by the above couple of forces. This fluid energy, or high-pressure energy, is discharged from a pump exit 18 through an elongated passageway (not shown) that divides the cone of the pintle into two. The discharged fluid enters the entrance, indicated by numeral 28, of the motor by way of a passage (not shown). The fluid energy acts in the manner reverse to the pump, and imparts the forces to the output rotating shaft 26. These forces are delivered as a torque from the shaft 26. After doing its work, the fluid flows into a suction port 19 in the pump via a discharge port 29 in the motor and via a passage (not shown). As is well known in the art, a cross relief valve, boost valve, or the like may be mounted in the passage that interconnects the pump and the motor, if necessary.

The volume of liquid displaced by the pump 1 varies depending on the eccentricity $d_1$ that is defined as the distance of the center of rotation $n_1$ of the cylinder barrel 14 from the center of rotation $m_1$ of the shaft 16. The eccentricity $d_1$ can be changed by shifting the pintle perpendicularly with respect to the center of rotation. Thus, the pintle functions as an eccentric member. The distance $d_1$ can be regarded as the eccentricity of the pintle 12. The pintle 12 is urged in one direction by a spring 8, and is urged in the opposite direction by an actuating rod 4. A lever 3 is attached to the rod 4 so that the rod 4 can be manually or mechanically actuated.

The rotational frequency of the motor 2 per unit fluid volume can be varied depending on the eccentricity $d_2$ of the pintle 22, which is defined as the distance from the center of rotation $n_2$ of the cylinder barrel 24 to the center of rotation $m_2$ of the rotating shaft 26. The pintle 22 is urged in one direction by a spring 9, and is urged in the opposite direction by the actuating rod 4.

The housings of the pump 1 and motor 2 are connected together by a connecting member 5 and screws 7. The actuating rod 4 can slide right and left along the connecting member 5. The locations at which the rod 4 is mounted to the housings are sealed by seal members 6 such as O-rings.

Figure 3:
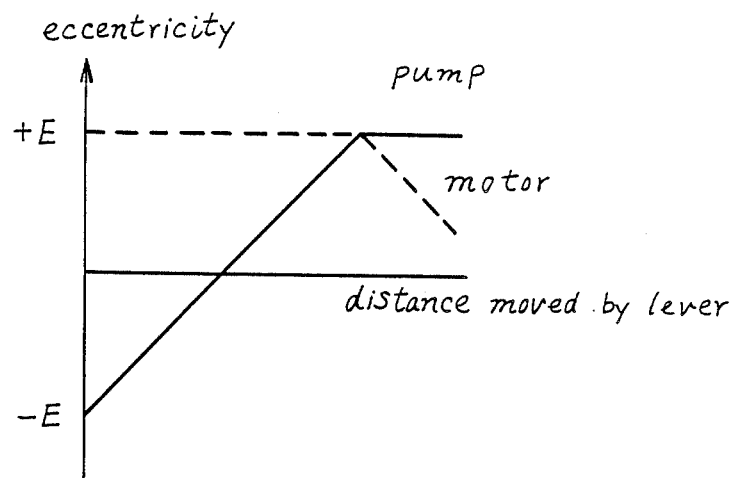
FIGS. 3 and 4 are graphs for illustrating the operation of the transmission shown in FIG. 1.

The manner in which the pintles 12 and 22 are shifted when the actuating rod is moved left or right by the use of the lever is now described by referring to FIG. 3. When the rod 4 is in its leftmost position, or its initial position, the pintle 12 is pushed into its leftmost position by the rod 4 and bears on the housing 11. In this state, the eccentricity of the pintle 12 is equal to $-E$. On the other hand, the pintle 22 of the motor 2 is pushed to the left into contact with the housing 21 by the spring 9. A gap l is left between the rod 4 and the pintle 22 and so the rod 4 does not act on the pintle 22. We assume that the eccentricity of the pintle 22 is equal to $+E$ under this condition.

If the rod 4 is then moved to the right, the pintle 12 is pushed by the spring 8 and shifted to the right, but the pintle 22 is not moved until the rod 4 comes into contact with pintle 22, at which time the rod 4 has traveled a distance of l. The right end of the pintle 12 bears against the housing and comes to a halt. If the rod 4 is moved further to the right, the pintle 12 is no longer shifted, but the pintle 22 is moved to the right by the rod 4. When the pintle 12 moves to the right, the distance traveled by the lever is taken to have a positive sign. When the pintle 22 moves to the left, the distance traveled by the lever is taken to have a negative sign. Thus, if distances have the same sign, then it follows that the rotations are identical in direction.

Figure 4:
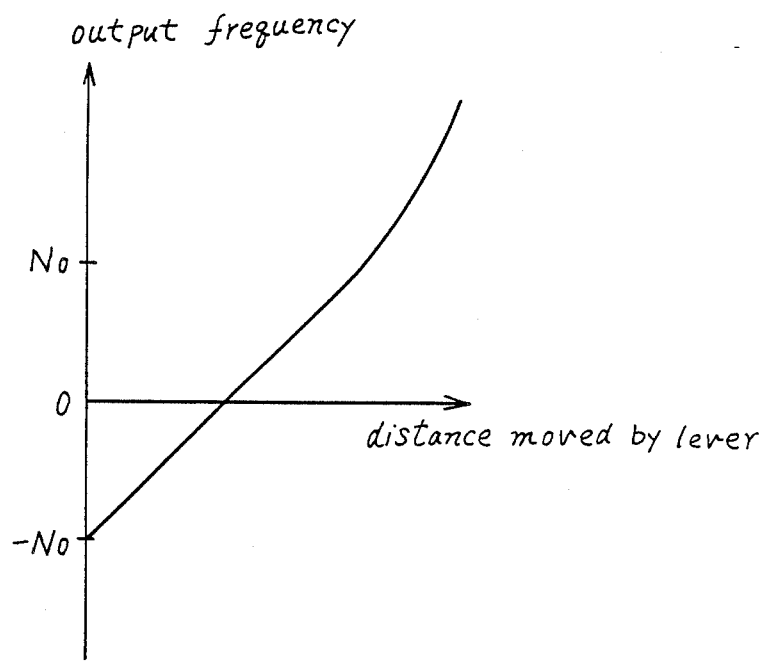

FIG. 4 shows the output rotational frequency plotted against the distance traveled by the lever when the input rotational frequency is maintained at a constant value of $N_0$. In such a case when the pump and the motor are identical in the diameter of pistons and in the number of pistons, when the lever is at its leftmost position, i.e., the distance traveled by the lever is zero, the output rotation is opposite in direction to the input rotation, but both rotations are identical in in rotational frequency. When the eccentricity of the pintle 12, or the eccentricity of the pump, is zero, the output rotation is equal to zero. When the eccentricity of the pump becomes equal to the eccentricity of the motor, the output rotation becomes equal to the input rotation. If the lever is moved further, the output rotational frequency increases.

Figure 2:
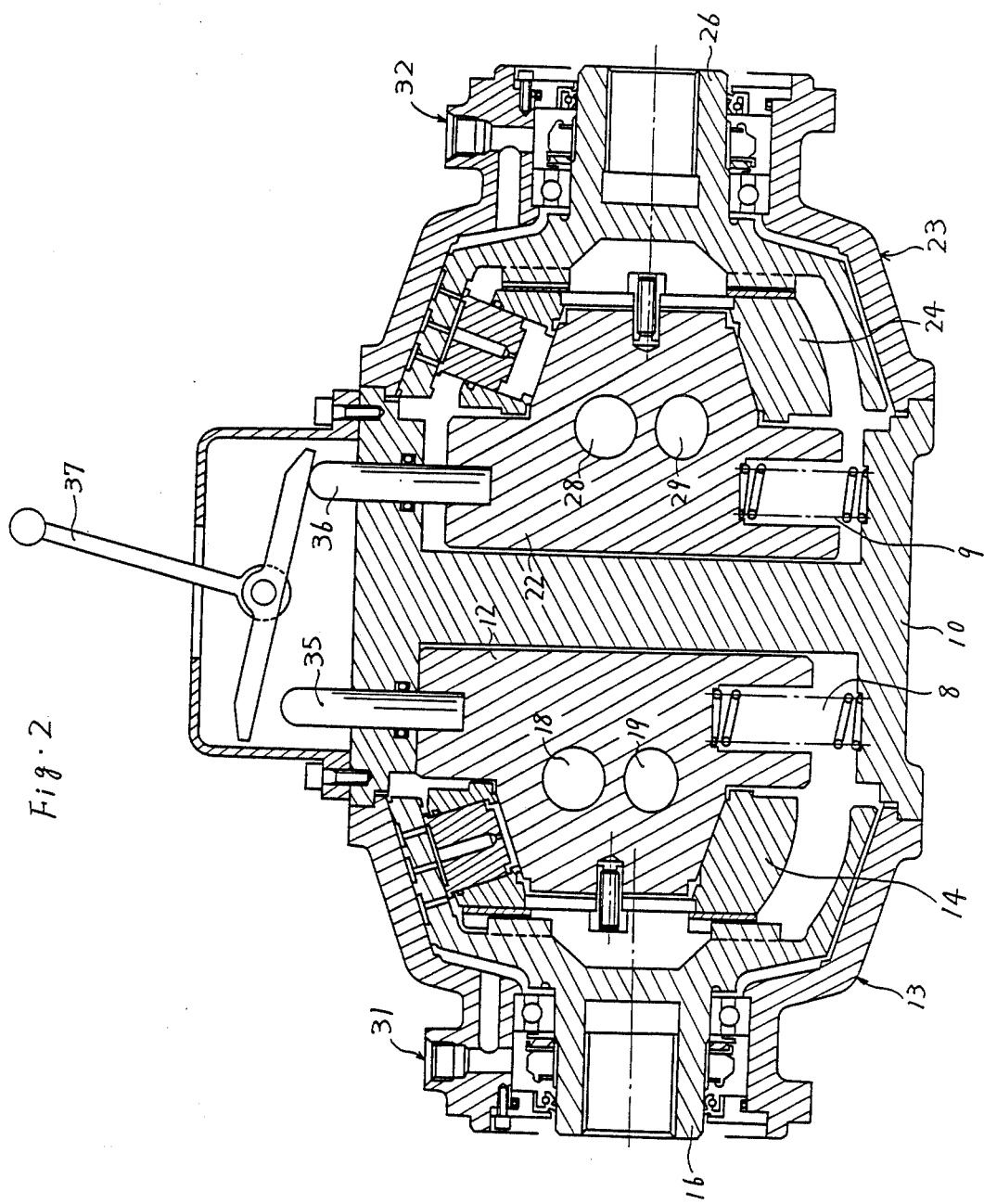
FIG. 2 is a side elevation in cross section of another embodiment of a mechanical transmission according to the instant invention.

Another embodiment of a hydraulic transmission according to the instant invention is shown in FIG. 2. This transmission also uses the same rotary fluid energy converters as are used in the embodiment already described in connection with FIG. 1. It is to be noted that like components are indicated by like reference numerals throughout FIGS. 1, 2, and 5. In the transmission shown in FIG. 1, the pump 1 and the motor 2 are disposed parallel to one another. In the transmission shown in FIG. 2, they are disposed in series and coupled together by a single housing 10. The pump 1 and the motor 2 are similar in operation to their corresponding counterparts shown in FIG. 1. However, the eccentricities of the pintles 12 and 22 are controlled by operating a rotary lever. More specifically, the pintles 12 and 22 that are eccentric members are urged by the springs 8 and 9, respectively, and are pressed by the lever, indicated by numeral 37, via pins 35 and 36, respectively. As the lever is rotated, the eccentricities vary. The relation of the eccentricities of the pintles 12 and 22 to the angle through which the lever rotates is also given as shown in FIG. 3. the output frequency varies as shown in FIG. 4. In the transmission shown in FIG. 2, the movable members of the hydraulic engines operate simultaneously in an interrelated manner. One embodiment of this arrangement is shown in FIG. 5.

The transmission shown in FIG. 5 is obtained by setting the length l of the transmission shown in FIG. 1 equal to zero on the surface. The pump and the motor shown in FIG. 5 are similar in operation to their corresponding counterparts shown in FIG. 1 and will not be described below. In the system shown in FIG. 5, the pintles 12 and 22 are moved in an interrelated manner by shifting the actuating rod 4. As the displacement of the pump is increased or decreased, the displacement of the motor is respectively decreased or increased, permitting sequential control. Obviously, this inventive concept can also be applied to the mechanism shown in FIG. 2 where a control input is applied through the use of the lever. In this case, pins 35 and 36 bear on the lever at the same time.

Although the invention has been described in its preferred forms with a certain degree of particularity, it should be understood that the invention is not limited to the illustrated embodiments. For example, in the illustrated embodiments, the rotary fluid energy converters are used as the hydraulic engines whose displacements of liquid is varied by movement of the eccentric member. Other hydraulic engines, such as swash plate type axial piston pump and motor and bent axis type axial piston pump and motor, may also be employed as the hydraulic engines. In this alternative case, swash plates or bent axes act as the movable members which are driven by the above-described actuating mechanism. This can provide a transmission in which speed can be smoothly varied. Also, the springs 8 and 9 are merely shown as examples of urging means. The actuating rod, the lever 3, the pins 35, 36, and the lever 37 are shown as an example of the mechanism through which a control input is applied. As an example, cams may be used in such a way that the rotation of each cam is controlled. Where a lever is used, the control force may take a mechanical form, such as hydraulic pressure, may use a screw feed mechanism or may utilize electromagnetic force.

Since the hydraulic transmission of the present invention for hydraulic engines, such as rotary fluid energy converters which have a small energy loss, as a pump and a motor, this efficiency is greatly improved. The control mechanism according to the invention is simple in structure and it allows a wide range of smooth speed change operation. As the output rotational frequency is proportional to the distance moved by the control mechanism, control operation is very easy.

We claim:

1. A hydrostatic transmission having a pump and a hydraulic motor which are in communication with each other through a fluid passage and each of which has one of an eccentric and inclined movable member that is moved to vary the volume of liquid discharged by the pump or motor, wherein the pump is driven by an input rotation and the motor provides an output rotation of a varied rotational frequency, said hydrostatic transmission comprising:

a first means for urging the movable member of the pump in a first direction;

a second means for urging the movable member of the motor in a second direction; and an actuating rod disposed between said movable members and operatively contacting said movable members of said pump and motor, which actuating rod moves the movable member of the pump a distance proportional to a control input thereto, and which, when the displacement of the pump is varied, retains the movable member of the motor to keep the displacement of the motor constant, and which, when the movable member of the pump is retained at a certain constant displacement position, moves the movable member of the motor a distance proportional to the control input.

2. A hydrostatic transmission having a pump and a hydraulic motor which are in communication with each other through a fluid passage and each of which has one of an eccentric and inclined movable member that is moved to vary the volume of liquid discharged by the pump or motor, wherein the pump is driven by an input rotation and the motor provides an output rotation of a varied rotational frequency, said hydrostatic transmission comprising:

a first means for urging the movable member of the pump in a first direction;

a second means for urging the movable member of the motor in a second direction; and an actuating rod disposed between said movable members and operatively contacting said movable members of said pump and motor, which actuating rod moves the movable member of the motor in such a way that when the movable member of the pump is moved to increase or decrease the displacement of the pump, the displacement of the motor respectively decreases or increases.

3. The hydrostatic transmission as set forth in claim 1, wherein when the rod is in either of its extreme positions, the rod bears against one of the movable members of the pump and the rotor, and a gap is left between the other and the rod.

4. The hydrostatic transmission as set forth in either claim 1 or 2, wherein the first and second means urges the movable members of the pump and the motor toward one another.

5. A hydrostatic transmission having a pump and a hydraulic motor which are in communication with each other through a fluid passage and each of which has one of an eccentric and inclined movable member that is moved to vary the volume of liquid discharged by the pump or motor, wherein the pump is driven by an input rotation and the motor provides an output rotation of a varied rotational frequency, said hydrostatic transmission comprising:

a first means for urging the movable member of the pump in a first direction;

a second means for urging the movable member of the motor in a second direction; and actuating pins protruding in the same direction from said movable members of the pump and the motor respectively, wherein the pump and the motor are mounted in a common housing; and a pivoted lever for contacting said pins to bias said pins and thus said movable members against said respective first and second means, and wherein said first and second directions are the same.

6. The hydrostatic transmission as set forth in claim 5, wherein the first and second means urges the pins toward the lever.

7. The hydrostatic transmission of claim 5, wherein the actuating pins and pivoted lever move the movable member of the pump a distance proportional to a control input from said lever, and which, when the placement of the pump is varied, retains the movable member of the motor to keep the displacement of the motor constant, and which, when the movable member of the pump is retained at a certain constant displacement position, move the movable member of the motor a distance proportional to the control input.

8. The hydrostatic transmission of claim 5, wherein the actuating pins and pivoted lever move the movable member of the motor such that when the movable member of the pump is moved to increase or decrease the displacement of the pump, the displacement of the motor respectively decreases or increases.

* * * * *